UNITED STATES PATENT OFFICE.

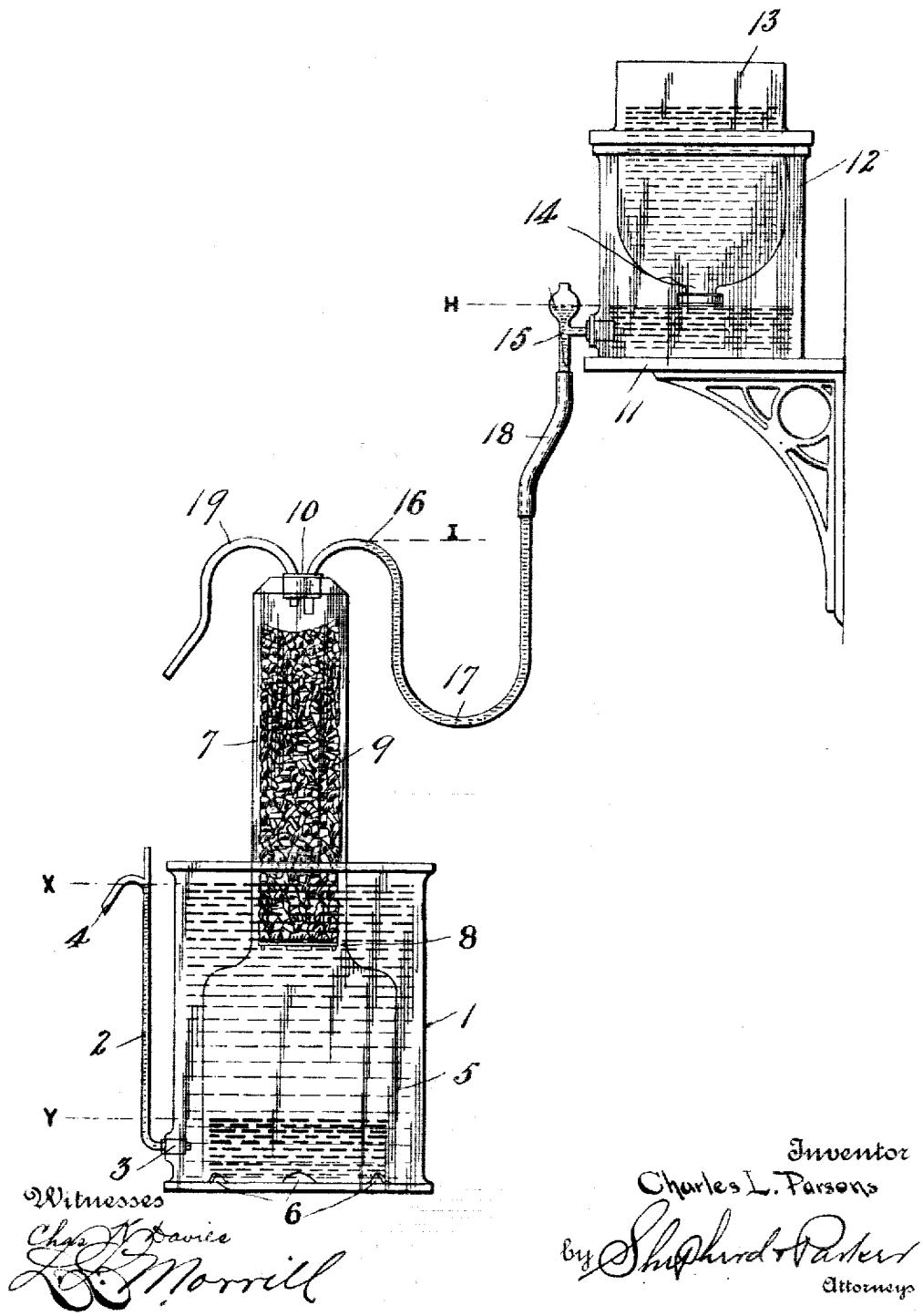

CHARLES L. PARSONS, OF DURHAM, NEW HAMPSHIRE.

GAS-GENERATOR.

No. 811,737.   Specification of Letters Patent.   Patented Feb. 6, 1906.

Application filed July 23, 1904. Serial No. 217,844.

*To all whom it may concern:*

Be it known that I, CHARLES L. PARSONS, a citizen of the United States of America, residing at Durham, in the county of Strafford and State of New Hampshire, have invented a new and useful Gas-Generator, of which the following is a specification.

My invention relates to gas-generators, and especially to that class of gas-generators wherein the gas is generated by the chemical action between a liquid and a solid, and more particularly to those generators wherein a liquid is supplied to a stationary granular solid and the flow of the liquid is controlled by the tension of the generated gas.

The objects of my invention are, first, to provide a device wherein the generation of gas is automatically controlled by the tension of the generated gas; second, to provide a device wherein the waste products of chemical reaction are automatically removed from the generator; third, to provide a device wherein the gas may be delivered at a predetermined constant tension, which tension may be varied at will; fourth, to provide a device adapted to obtain the full efficiency of the active agent by causing a relatively small quantity of the liquid to flow over a relatively large quantity of the solid; fifth, to provide a device wherein fresh and unused liquid may at all times be supplied to the solid, and, sixth, to provide a device wherein the liquid in the supply-reservoir may be replenished without interrupting the generation of gas.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawing, which represents the preferred embodiment of my invention, a tank 1 is shown as provided with an overflow-pipe 2, preferably communicating with the tank 1 near the bottom thereof, as at 3. This pipe 2 is provided at its upper end with a bent portion 4, adapting it for use as an overflow, the said portion 4 being adapted to receive a flexible tube for conducting away the overflow liquid.

Within the tank 1 is submerged the gas-receptacle 5, which is open at its lower end and preferably provided with openings 6 to permit of the uninterrupted passage of the liquid from the tank to the receptacle. The receptacle 5 is provided with a hollow column 7, communicating therewith and carrying a perforate support 8, disposed within its lower end and adapted to support a solid material thereon, as shown at 9. The upper end of the column is closed in any approved manner, as by the stopper 10.

On some convenient elevation, as the shelf 11, is disposed a reservoir 12. A vessel 13, with a reduced neck 14, is filled with a liquid and inverted in the reservoir 12. A pipe 15 communicates with the reservoir 12 near its bottom and below the level of the neck 14. A pipe 16 pierces the stopper 10 and is so bent as to form a U-seal, as indicated at 17. This pipe is connected with the pipe 15 by flexible tubing 18. A pipe 19 also pierces the stopper 10 and serves as an exit for the generated gas.

The operation of my improved gas-generator is as follows: The tank 1 being filled approximately one-half full of a liquid, the column 9 is charged with the solid, the stopper 10 placed in position, and the gas-receptacle 5 inverted in the tank 1. The liquid in the tank 1 will rise a certain distance within the receptacle 5, but will not contact with the contained solid 9. The vessel 13 is filled with a liquid and inverted, with its reduced neck 14 within the elevated reservoir 12. The pipes 15 and 16 are connected by the flexible tube 18, which permits the liquid to flow through the pipe 16 and into contact with the solid 9, generating a gas, which passes downward into the receptacle 5. The tension of the generated gas forces the liquid through the openings 6 into the tank 1, in which it rises, as well as in the tube 2, to the level X, which is the overflow-level of the tank 1. The height of the reservoir 12 is so regulated that the distance between the levels H and I equal the distance between the levels X and Y.

It is obvious that the tension of the gas within the receptacle 5 is equal to the weight of a column of liquid of the height XY. As the weight of a column of liquid of the height HI equals the weight of a column of liquid of the height XY, it is obvious that when the level Y is depressed to slightly increase the distance XY the flow of liquid through the pipe 16 will be stopped and that when through the consumption of gas the level Y is raised slightly the pressure represented by HI overbalances the pressure represented by XY and liquid will flow through the pipe 16 into contact with the solid 9. The mouth of the vessel 13 is disposed at the level H, so that the level H is constant relative to the reservoir 12, but may be varied, thus varying the pressure HI by raising or lowering the reservoir. The raising or lowering of the reservoir varying the pressure represented by HI likewise varies the pressure represented by XY, which is the measure of the tension upon the gas. It is also obvious that the solid 9 being contained in a relatively tall column 7 is brought into contact with the limited quantity of the liquid flowing through the pipe 16 to a greater extent than would be the case if the solid was disposed over a larger horizontal area. It will also be seen that the liquid flowing through the pipe 16 after reacting with the solid carries with it the inert products of the reaction, which with the used liquid are deposited in the tank 1 and are discharged through the overflow-pipe 2. It will thus be seen that the tension of the gas at all times equals the pressure represented by HI, which pressure may be varied by raising or lowering the tank 12.

My improved generator may be used for the generation of acetylene by the action of water upon calcium carbid, or hydrogen sulfid by the action of sulfuric or hydrochloric acid upon iron sulfid, or the generation of carbon dioxid by the action of sulfuric or hydrochloric acid upon a carbonate, or for the generation of hydrogen gas by the action of sulfuric or hydrochloric acid upon zinc. Its use is not to be considered, however, as being confined to the generation of the said gases, but may be used for the generation of any gas produced by the action of a liquid upon a solid.

While I have shown my preferred form of apparatus for carrying out my invention, it is obvious that the several parts thereof may be varied as to form, proportion, and details of construction without departing from the spirit of my invention or the scope of the appended claims.

Having thus described my invention, what I claim as novel, and desire to secure by Letters Patent, is—

1. In a gas-generator, a tank provided with an overflow communicating with said tank adjacent the bottom, a receptacle open at the bottom and closed at the top disposed within the tank, means within the receptacle for supporting a solid in granular form and means for supplying a liquid under constant head to the top of the receptacle.

2. In a gas-generator, a tank adapted to contain a liquid and provided with an overflow communicating therewith adjacent the bottom, a receptacle open at the bottom and submerged in the tank, a hollow solid-containing column open at the bottom, integral with and communicating with the said receptacle, a tube provided with a liquid seal and communicating with the column and an elevated reservoir adapted to supply liquid to the column through the pipe at a constant pressure equal to the normal pressure exerted on the gas by the liquid in the said tank.

3. In a gas-generator, a reservoir adapted to contain a liquid, a vessel with a reduced neck inverted in said reservoir, and disposed to form a liquid seal, a pipe connected with the reservoir below the level of the vessel-neck and provided with a liquid seal, a tank adapted to contain a liquid and provided with an overflow communicating therewith adjacent the bottom, a receptacle open at the bottom and submerged in the tank, a hollow solid-containing column open at the bottom and integral with and communicating with the said receptacle and disposed to receive a liquid from the said pipe and all so disposed that the pressure of the liquid from the reservoir shall equal the pressure of the liquid in the tank and be sustained thereby through the medium of the gas in the receptacle.

In testimony whereof I have signed my name to this specification in the presence of two subscribing witnesses.

CHARLES L. PARSONS.

Witnesses:
JAMES D. ROBERTSON,
LIZZIE G. THOMPSON.